C. W. KING.
TIRE RIM TOOL.
APPLICATION FILED MAY 6, 1922.
1,431,163.
Patented Oct. 10, 1922.
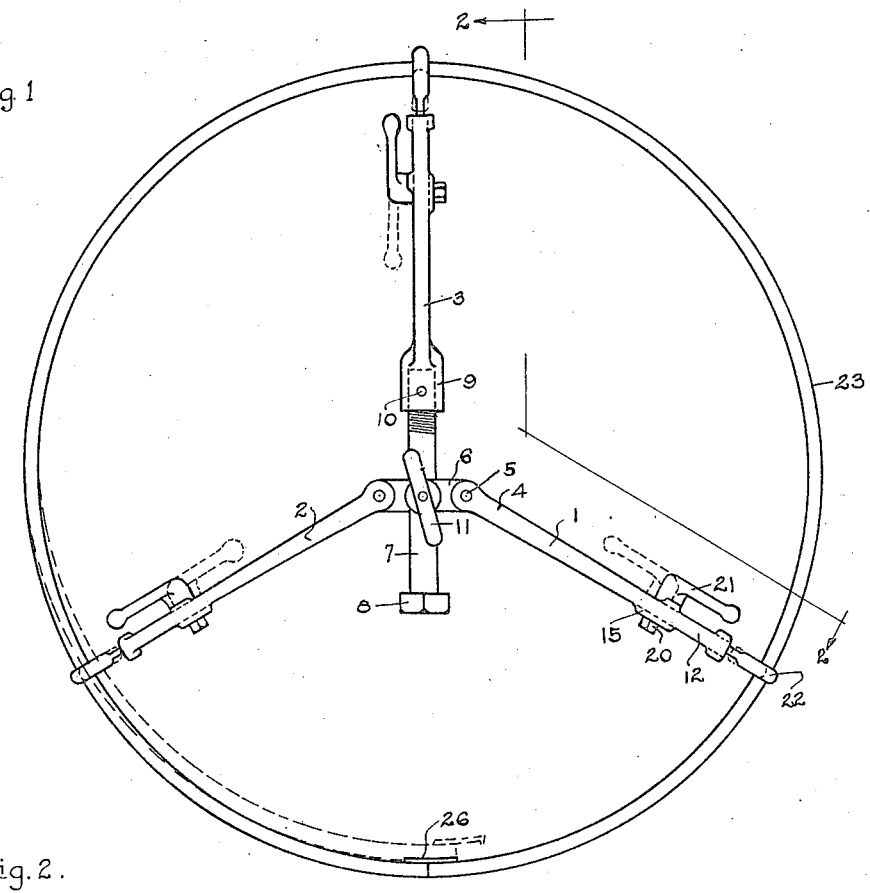
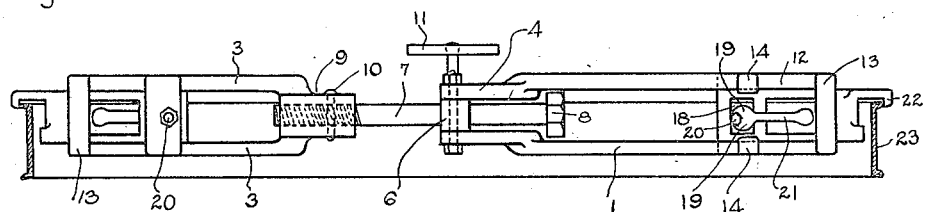
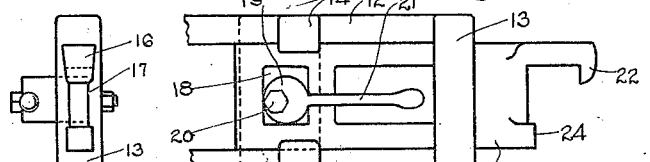
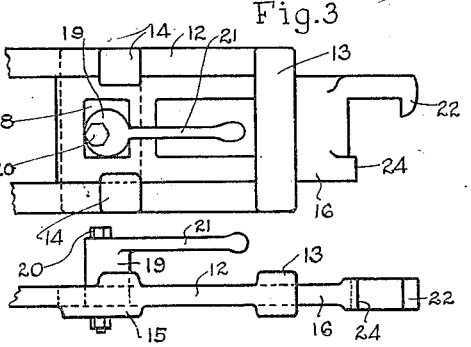
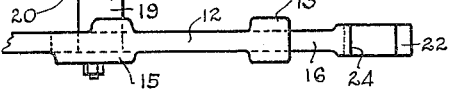
Inventor
Chas. W. King.
Attorney Patented Oct. 10, 1922.

1,431,163

UNITED STATES PATENT OFFICE.

CHARLES W. KING, OF MEMPHIS, TENNESSEE, ASSIGNOR TO THE KING-QUIGLEY MANUFACTURING CO., OF MEMPHIS, TENNESSEE, A COPARTNERSHIP COMPOSED OF P. J. QUIGLEY AND C. W. KING.

TIRE-RIM TOOL.

Application filed May 6, 1922. Serial No. 559,011.

*To all whom it may concern:*

Be it known that I, CHARLES W. KING, a citizen of the United States of America, residing at Memphis, in the county of Shelby and State of Tennessee, have invented certain new and useful Improvements in Tire-Rim Tools, of which the following is a specification.

My invention relates to an improvement in tire rim tools which are especially adapted for the contraction and expansion of demountable split rims to facilitate the removal and remounting of pneumatic tires thereon.

My invention is especially adapted for the manipulation of the heavy demountable rims, such as are utilized on trucks.

One object of my invention is to provide a rim tool having three engaging members, one adapted to engage the rim on each side of the joint, and the third at a point diametrically opposite the joint, all engaging members being adjustably connected together to fit the rims of different diameters and each rim engaging member comprising an individual actuator for moving it radially independently of the others to thus enable the different sections of the rim to have pressure selectively applied thereto as may be best suited for each operating condition.

My invention also comprises the novel details of construction and arrangements of parts, which are hereinafter more particularly described and set forth in the appended claims, reference being had to the accompanying drawings which form a part of this specification, and in which:—

Fig. 1 is a view showing my improved rim tool applied to a rim preparatory to contracting it.

Fig. 2 is a view of the tool in side elevation.

Fig. 3 is an enlarged side view of one of the eccentric members.

Figs. 4 and 5 are respective end and bottom views of Fig. 3.

Similar reference numerals refer to similar parts throughout the drawings.

In the embodiment of my invention illustrated, I show a rim tool comprising three rim engaging members 1, 2 and 3, the members 1 and 2 having their inner ends 4 bifurcated and adapted to straddle and be pivotally connected by bolts 5 to the opposite ends of a slide block 6. This slide black 6 has a central aperture to receive the unthreaded shank 7 of a screw bolt 8 having a threaded end adapted to be screwed into a threaded socket 9 at the inner end of the rim engaging member 3, and to be secured by a cotter key or pin 10. The slide block 6 has on one side a threaded opening to receive a set screw 11 by means of which the slide may be secured in any desired adjusted position on the bolt shank 7. The rim engaging members 1 and 2, are similar and a description of one will serve for both. Each member comprises a main frame having spaced side bars 12 connected by a cross head 13 at their free ends and at an intermediate point being provided with overhanging lugs 14 disposed opposite an integral cross bar 15. The inner opposed faces of the lugs 14 and bar 15 are spaced the thickness of the sides 12 and thus serve as guides for a rim engaging slide which comprises a shank 16 which slides through a correspondingly shaped aperture 17 in the cross head 13 and has its inner end received between the guide members 14 and 15. This inner end is provided with a transverse laterally elongated opening 18 which, in the form shown, is rectangular and has mounted therein a cam or eccentric 19 free to turn on a pivot bolt 20 passing downwardly therethrough and through the cross bar 15. A handle 21 is provided for operating the eccentric or cam which serves to shift the bar 16 lengthwise in its guides.

At its rim engaging end the slide 16 is provided on one side with a hook 22 adapted to engage over the flange of a demountable rim 23 and at its other edge is provided with a pusher shoulder 24 adapted to engage the inner face of the rim near its center.

The construction of the rim engaging member 3 is in all respects similar to that described for the members 1 and 2, except that instead of having the bifurcated inner ends 4 the member 3 has its sides integral with the threaded socket 9 into which the bolt 8 is screwed. I show the rim 23 formed with a split 25.

To operate the tool, I apply to the rim all three of the engaging members 1, 2 and 3, causing the hook members 22 of the slides 16 to overhang a side flange of the rim, as indicated more clearly in Fig. 2. All of the cam levers 21 should be thrown to full line position, Fig. 1, which moves the slides 16 to their extreme outward position. I then loosen the set screw 11 on the slide block 6 and slide it on the bolt shank until all three hooks 22 tightly engage the rim flange. I then tighten the set screw 11 so as to clamp the block fixedly on the bolt shank and when this is done the tool is ready to manipulate the rim. To collapse the rim sufficiently for the removal of the casing I first operate the cam lever 21 on the member 1 or 2, drawing in that one first which engages the rim end on which the lug 26 overlapping the joint is mounted. This brings the rim ends out of engagement. I then draw in the other member 1 or 2, further contracting the rim, and finally I manipulate the lever of the member 3 to bring the rim to its full collapsed position, when the tire can be readily removed without the use of other tools and the rim tool is left holding the tire in this position until the new tire is replaced on the rim. I then reverse the cam levers 21 successively, allowing the rim to expand back against the casing until its ends come back against the casing. I next release the set screw 11 in the slide block and, after making sure that all levers 21 are set with their ends pointing to the center, I shift the slide block until the pusher shoulders 24 of the slides come into contact with the inside of the rim. I then tighten the set screw in the block and throw the cam controlling the slide 16 that was first pulled in so as to push the slide against the rim and bend its ends back into locked position. If necessary the other cams can be operated in succession until the rim is forced back into position, but, generally, it is only necessary to manipulate one of the cam levers to expand the rim.

Though I have described with great particularity the details of the embodiment of the invention herein shown, it is not to be construed that I am limited thereto as changes in arrangement and substitution of equivalents may be made by those skilled in the art without departing from the invention as defined in the appended claims.

Having thus described my invention, what I claim as new and desire to secure by Letters Patent, is:—

1. In a rim tool of the character described, a plurality of rim actuators adjustably connected and each having a movable rim engaging member, and cam means carried by each actuator for moving its respective rim engaging member radially in both directions.

2. A rim tool of the character described, comprising three rim actuating elements, and means adjustably connecting said elements together to adapt them to engage rims of different diameters at spaced points, each element comprising an individual actuator to move radially the rim portion engaged by it.

3. A rim tool of the character described, comprising a pair of rim actuating elements hingedly connected to a slide block, a third rim actuating element having a slide with which said block is engaged, and means to clamp the block in adjusted positions on said slide, each element comprising a slide bar having end members adapted to engage over and under the rim, and an actuator to move its respective slide bar radially.

4. A device in accordance with claim 3, in which said actuator is an eccentric and the slide arm carries a strap co-acting therewith.

5. A device in accordance with claim 1, in which each rim actuator comprises a guide, a bar adapted to slide in the guide and carrying at its inner end an eccentric strap and at its outer end members adapted to engage over and under a tire rim, and an eccentric mounted in the guide and working in said strap, as and for the purposes described.

6. In a rim tool, a plurality of rim actuators, a bolt connected to the inner end of one actuator, a slide block adjustable on the bolt, a set screw to clamp the block on the bolt, and a pair of said actuators hingedly connected at their inner ends to the ends of said block, each of said actuators comprising a frame having a slide guide therein, a bar slidable in each guide and having at its outer end members adapted to engage over and under a rim, an eccentric pivoted on each frame, there being a slot at the inner end of each slide bar which forms a strap for its respective eccentric, and a lever for each eccentric.

In testimony whereof I affix my signature.

CHARLES W. KING.

Witness:
P. J. QUIGLEY.